Feb. 21, 1956     J. MIHALYI     2,735,772
CHAMBER CLOSING MEMBER
Filed March 13, 1951
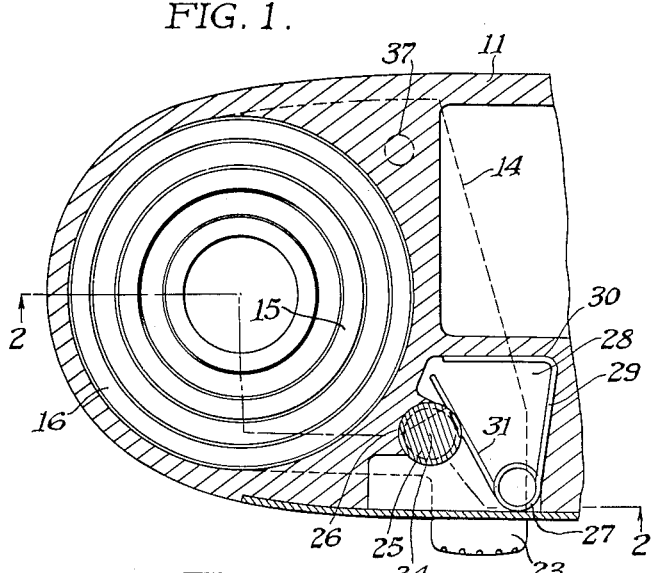
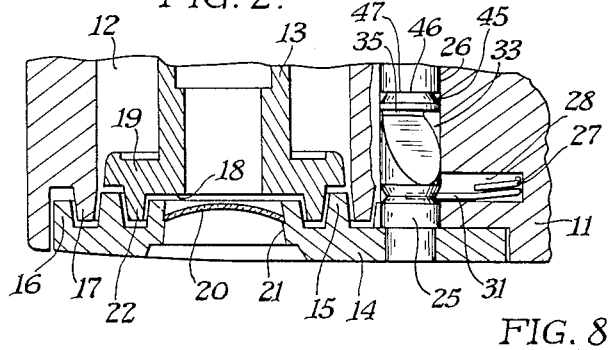
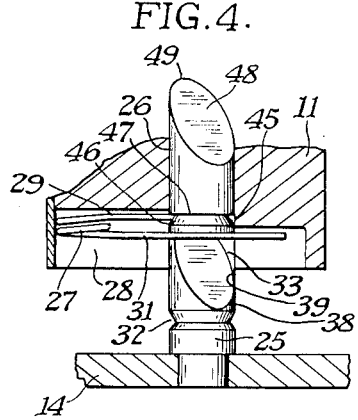
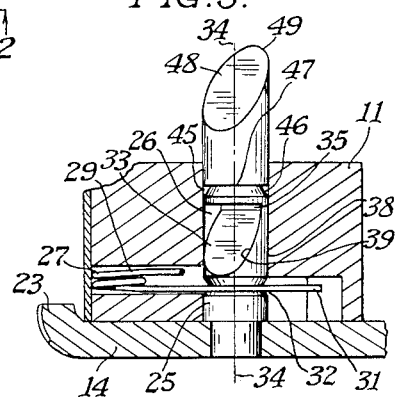
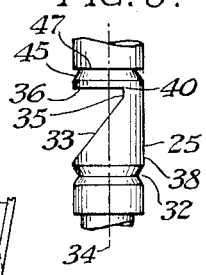
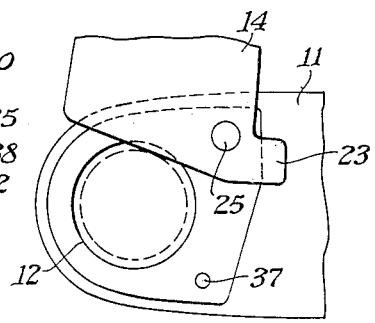
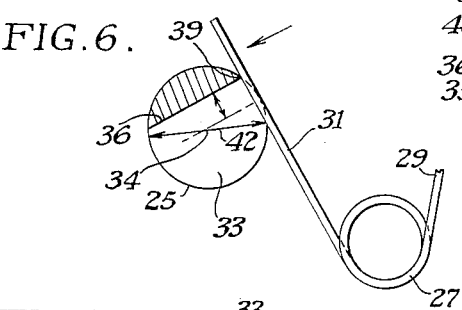
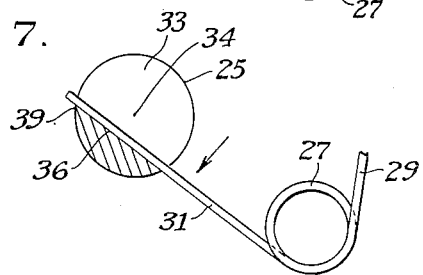
JOSEPH MIHALYI
INVENTOR.
BY Daniel J. Mayne
J. Griffin Little
ATTORNEYS

1

2,735,772

CHAMBER CLOSING MEMBER

Joseph Mihalyi, Rochester, N. Y., assignor to Eastman Kodak Company, Rochester, N. Y., a corporation of New Jersey Application March 13, 1951, Serial No. 215,345

7 Claims. (Cl. 95—31)

The present invention relates to a roll film camera, and more particularly to a cover or closure member for covering and uncovering a chamber adapted to receive a roll of film.

In most types of roll film cameras now on the market, film supply and film take-up chambers are positioned on opposite sides of the exposure frame. Access to these chambers for threading the film and removing the exposed roll is secured by means of a removable back.

The chamber cover of the present invention is primarily, although not necessarily, designed for use with the extrusion loading camera of the type illustrated and described in Mihalyi Patent 2,364,381 granted December 5, 1944. In this type of camera, no removable back is provided. On the contrary, the loading or supplying chamber is in the form of a cylindrical recess provided in one end of the camera body. The unexposed roll of film is positioned in this chamber or recess and the latter is then closed in a light locking relation. The film is completely unwound from the supply spool, passed across the exposure frame and coiled up in the take-up chamber at the opposite end of the camera. As the exposures are made, the supply spool is rotated to withdraw the film successively from the coil in the take-up chamber, and rewind the exposed film areas back onto the supply spool in the supply chamber. As this camera does not, per se, form a part of the present invention, details thereof are not illustrated or described. Reference may be had to the above-mentioned patent for structural details of the camera.

The present invention relates to a novel form of cover or closure member for the spool chamber. The cover is pivotally and slidably mounted in the camera body so that it may be slid axially of the film spool toward and away from the camera body. Upon being moved away from the body, the cover is rocked automatically to shift the cover out of registering relation with the chamber to permit access thereto, so that a new roll of film may be placed in the chamber or the exposed roll removed therefrom. A spring serves to retain the cover yieldably either in its chamber closing position or in its inoperative position. The rocking movement of the cover is secured by cooperating relation of the spring and a specific form of cam on the shaft carried by the cover. As the latter moves away from the body, the holding spring moves along the cam and finally passes beyond the longitudinal axis of the shaft. At this point, the spring is in an offset relation to the shaft and a turning couple is provided which serves to rock the shaft and cover to move the latter to its inoperative position. The spring also limits the rocking movement of the cover and serves to retain the latter releasably in said position, all as will be later described.

The present invention has as its principal object a new and improved form of cover for a film chamber.

Another object of the invention is the provision of a cover of the class described which is held securely yet releasably in either position of adjustment.

Still another object of the invention is the provision of a novel structure for moving the cover automatically to an uncovering position and out of registry with the film chamber.

Yet another object of the invention is the provision of a cover moving and holding means which is simple in structure, comprises few parts of rugged construction, easy to operate, and highly effective in use.

To these and other ends the inventive idea is embodied in certain improvements and combinations of parts, all as will be hereinafter more fully described, the novel features being pointed out in the claims at the end of the specification.

In the drawings:

Fig. 1 is a horizontal sectional view through the spool chamber of a camera, with the spool removed, showing the relation of the cover parts, and with the cover in the chamber closing position;

Fig. 2 is a vertical sectional view through the chamber of Fig. 1 with the spool in position and taken substantially on line 2—2 of Fig. 1 showing the relation of the cover parts and the cooperating light lock members on the cover and spool;

Fig. 3 is a vertical section through the chamber taken from the opposite side to that shown in Fig. 2, showing the means for holding the cover in its chamber closing position;

Fig. 4 is a view similar to Fig. 3 with the cover moved away from the camera body and in the uncovered position shown in Fig. 5;

Fig. 5 is the bottom view of a portion of the camera, showing the cover rocked to its inoperative position;

Fig. 6 is a horizontal sectional view through the cover shaft showing the relation of the spring to the shaft so as to provide a turning couple which rocks the shaft and cover;

Fig. 7 is a view similar to Fig. 6 showing the relation of the spring and shaft at the end of the rocking action; and Fig. 8 is a side elevation view of the cover shaft, showing the slot and cam arrangement with which the turning spring cooperates, and the inclined surface for camming the spring into operative relation during assembly.

Similar reference numerals throughout the various views indicate the same parts.

The drawings show a portion of a camera body 11 adapted to receive a film spool 13 on which a roll of film is wound in the usual well known manner. The film is unwound from and rewound back onto the spool in the manner described in the above-mentioned Mihalyi patent to which reference may be had. A cover 14 is provided for closing the recess or chamber 12 to retain spool 13 in light tight relation therein. The cover 14 may be formed of any suitable material, such as thin sheet metal. The inner surface of the cover is formed with an inner light lock flange 15. A turned up flange 16 on the cover 14 cooperates with the flange 15 and a flange 17 on the body 11 to prevent light from reaching the film spool 13, as is deemed apparent from an inspection of Fig. 2. The end 18 of spool flange 19 is provided with a printed disc, not illustrated, which indicates the type of film on the spool. This disc may be viewed through window 20 formed on the cover 14. The light lock for the window is provided by a drawn recess 21 in cover 14 and the light lock flange 22 on the spool flange 19, see Fig. 2. Thus, the cover when in closed position, see Fig. 2, is in light tight relation with the camera body to protect the film and the spool against light.

The cover 14 has riveted or otherwise secured thereto, a shaft 25 which is positioned loosely in a recess 26 arranged adjacent and substantially parallel to chamber 12, as best shown in Figs. 1 and 2. A hairpin spring is formed with a coil portion 27 which is positioned in a recess 28 formed in body 11 to the right of shaft 25, as viewed in Fig. 1. This spring is formed with an L-shaped portion or arm 29 which lies against a corresponding wall 30 of recess 28. Another arm 31 of the spring has a portion adjacent the free end thereof positioned in a circumferential V-shaped notch 32 formed on the periphery of shaft 25. The engagement of arm 31 in notch 32 serves to retain or hold the cover releasably in its closed position, as shown in Figs. 2 and 3. Just above notch 32 the shaft is formed with a 45° notch 33 which extends axially along and radially across the longitudinal axis 34 of the shaft, and finally terminates in a vertical edge 35 which is positioned beyond axis 34 and to the right thereof, as shown in Fig. 8. The top of notch 33 terminates in a straight, radial shoulder 36. As the edge 35 is positioned beyond or to the right of the axis 34, as shown in Fig. 8, the shoulder 36 constitutes a chord of the shaft 12 and the length of this chord is less than the diameter 42 of the shaft, as illustrated in Fig. 6. The purpose of this structure will be described presently. The cover 14 is also formed with a short dowel pin 37 which is parallel to shaft 25 and is adapted to be received in the registering opening or recess of the body 11 when the cover 14 is in closed position.

As best shown in Fig. 3, the arm 31 of the hairpin spring is positioned to engage the side of shaft 25 from which the notch 33 is formed. The result is that when a finger piece 23 on the cover is grasped and the cover moved downward, as viewed in Figs. 2, 3, and 4, the V-shaped notch 32 serves to cam the arm 31 of the spring out of the notch and onto the periphery 38 of shaft 25. As the downward movement is continued, the dowel 37 is gradually withdrawn from its registering recess. Such movement also will cause arm 31 of the spring to ride on the periphery 38 of the shaft until notch 33 is reached. Continued downward movement of the cover and shaft will finally bring edge 39 of notch 33 into engagement with arm 31. The latter continues to ride on the edge 39 until the latter finally cuts the axis 34. As mentioned above, chord 36 being beyond the axis 34, has a length less than the diameter of the shaft. The result is that when the arm 31 is positioned along edge 39 beyond the axis 34, the arm 31 moves slightly toward the center of the shaft or slightly to the left, as viewed in Fig. 6. When the arm 31 finally reaches the end of its travel, it engages point 40, which is the juncture of edge 35 and shoulder 36, see Figs. 6, 7, and 8. From an inspection of these figures it is apparent that the point 40 is spaced a distance x from the center 34 of the shaft, and also is spaced slightly inward from the periphery of the shaft at the diameter 42. The final position of the arm 31 is shown in Fig. 6. The engagement of arm 31 on point 40 provides a turning couple which serves to impart an automatic counter-clockwise rocking movement to shaft 25 to rock the latter, in the direction of the arrow, from the position shown in Fig. 6 to that illustrated in Fig. 7. The rocking of the shaft 25 simultaneously rocks cover 14 about 90° from the position shown in Fig. 1 to that shown in Fig. 5 to uncover the recess 12 to permit access thereto. When the shaft and cover have been rocked through 90° to the position shown in Fig. 5, the arm 31 finally engages the surface or shoulder 36 which arrests further rocking of the shaft and cover and retains the latter releasably in its open or inoperative position.

Thus, as the shaft 25 and cover 14 are moved downward, arm 31 of the spring is first cammed out of notch 32. Further downward movement then causes the arm 31 to ride along edge 39 of notch 33 until axis 34 is passed, whereupon the arm 31 cams slightly and toward the center 34, or to the left, as viewed in Fig. 6, until the arm 31 finally reaches point 40, and the arm 31 then automatically imparts the rocking movement to the shaft and cover to move the latter to its open position, and out of registry with chamber 12. After a new roll of film has been placed in the recess, the cover and shaft may be rocked manually from the position shown in Fig. 5 to the position shown in Figs. 1 and 6, to bring the cover 14 into registering relation with the recess 12. The cover is then moved upward, as viewed in Figs. 3 and 4. Such movement will cause arm 31 to ride along edge 39, and when the cover has reached its fully closed position, the arm 31 will then register with and snap into the groove 32 to hold the cover releasably and yieldably in closed position. Thus, the spring arm 31 not only serves to retain the cover in closed position, but also automatically rocks the cover to an inoperative position when the cover is moved away from the body 11, and releasably retains the cover in said open position.

Referring now to Figs. 4 and 7, it is apparent that when the cover is in its open position, the arm 31 will engage shoulder 36. However, if the operator should inadvertently or unintentionally rotate the cover 14 manually in either direction a sufficient distance, the arm 31 will be cammed automatically onto the periphery 38 of the shaft opposite the slot 33. In this position the arm 31 would no longer serve to hold the shaft 25 and the latter, as well as the cover 14, could be completely withdrawn and detached from the camera body. In order to overcome this possibility, the shaft 25 is provided with a second circumferential slot 45 positioned above slot 33, as viewed in Figs. 3 and 4. It will be noted that the slot is inclined only on one side 46, while the other side terminates in a straight radial shoulder 47. With this arrangement, any attempt to withdraw shaft 25 will cause arm 31 to drop into notch 45 and finally engage shoulder 47. Such engagement will lock the shaft 25 in its axial position and will effectively prevent withdrawal from the recess 26 and thus prevent detachment of the cover and its shaft from the camera body.

From an inspection of Fig. 1 it is apparent that the arm 31 of the spring yieldably engages the shaft 25. Therefore, before assembly of the shaft and cover, the arm 31 will be positioned slightly to the left from that illustrated in Fig. 1 and might tend to interfere with the insertion of the shaft 25 in the recess 26. In order to permit assembly, the inner or free end of shaft 25 is provided with an inclined end or cam surface 48 which is preferably positioned on the same side of the shaft 25 as notch 33. In assembling the cover and the shaft are arranged in their inoperative positions, as shown in Fig. 5.

The end of the shaft is then inserted in recess 26, so as the shaft is slid into the recess the end 49 of the cam surface 48 engages with the arm 31. As the sliding of the shaft is continued, the surface 48 gradually cams the arm 31 to the right to the position shown in Fig. 1. After the arm 31 has thus been cammed, the cover and shaft may be rotated manually to position the cover in registering relation with the recess 13. Such movement will cause arm 31 to engage and ride on the periphery 38 of the shaft. As the inward movement of the shaft is continued, the arm will ride over slot 45 and along edge 39. However, when the cover has been moved to its completely closed position, the dowel 37 will be received in this aperture, and the arm 31 will snap into notch 32 to hold the cover yieldably and releasably in closed position. Thus, the cover and shaft may be quickly and easily assembled on the camera body and moved to closing position. However, when the exposed roll is to be removed and a new roll inserted in recess 12, the cover may be quickly moved away from the camera body, and then rocked automatically to a position out of registry with the recess 12 to permit access thereto.

While one embodiment of the invention has been disclosed, it is to be understood that the inventive idea may be carried out in a number of ways. This application is, therefore, not to be limited to the precise details described, but is intended to cover all variations and modifications thereof which fall within the scope of the appended claims.

What I claim and desire to be secured by Letters Patent of the United States is:

1. In a roll film camera, the combination with a camera body formed with a spool receiving chamber, of a closure member movable to one position to close said chamber, a depending shaft carried by said member and slidably positioned in a registering opening formed in said body, a spring member carried by said body and engaging said shaft yieldably to retain said member releasably in chamber closing position, said closure member being movable axially toward and away from said chamber in axial registration therewith, and means on said shaft for camming said spring to an off center relation with said shaft when said member is moved away from said body to render said spring effective to rock said shaft and member about the axis of said shaft to move said member out of registry with said chamber.

2. In a roll film camera, the combination with a camera body formed with a spool receiving chamber, of a closure member movable to one position to close said chamber, a depending shaft carried by said member and slidably positioned in a registering opening formed in said body, a spring member carried by said body and engaging said shaft yieldably to retain said member releasably in chamber closing position, said closure member being movable axially toward and away from said chamber in axial registration therewith, means on said shaft for camming said spring to an off center relation with said shaft when said member is moved away from said body to render said spring effective to rock said shaft and member about the axis of said shaft to move said member out of registry with said chamber, and means on said shaft engaged by said spring to limit the movement of said member away from said body.

3. In a roll film camera, the combination with a camera body formed with a spool receiving chamber, of a closure member movable to one position to close said chamber, a depending shaft carried by said member and slidably positioned in a registering opening formed in said body, a spring member carried by said body and engaging said shaft yieldably to retain said member releasably in chamber closing position, said closure member being movable axially toward and away from said chamber in axial registration therewith, and a cam formed on said shaft, said cam extending axially along said shaft and radially from a point at one side of said shaft to a point beyond the axis of said shaft, as said member is moved away from said body said spring will move along said cam until said second point is reached at which time the spring will engage the shaft in an eccentric relation and will impart a rocking movement to said shaft to move said member automatically out of registering relation with said chamber.

4. In a roll film camera, the combination with a camera body formed with a spool receiving chamber, of a closure member movable to one position to close said chamber, a depending shaft carried by said member and slidably positioned in a registering opening formed in said body, a spring member carried by said body and engaging said shaft yieldably to retain said member releasably in chamber closing position, said closure member being movable axially toward and away from said chamber in axial registration therewith, a cam formed on said shaft, said cam extending axially along said shaft and radially from a point at one side of said shaft to a point beyond the axis of said shaft, as said member is moved away from said body said spring will move along said cam until said second point is reached at which time the spring will engage the shaft in an eccentric relation and will impart a rocking movement to said shaft to move said member automatically out of registering relation with said chamber, and means for limiting the rocking movement of said shaft and member.

5. In a roll film camera, the combination with a camera body formed with a spool receiving chamber, of a closure member movable to one position to close said chamber, a depending shaft carried by said member and slidably positioned in a registering opening formed in said body, a spring member carried by said body and engaging said shaft yieldably to retain said member releasably in chamber closing position, said closure member being movable axially toward and away from said chamber in axial registration therewith, a cam formed on said shaft, said cam extending axially along said shaft and radially from a point at one side of said shaft to a point beyond the axis of said shaft, as said member is moved away from said body said spring will move along said cam until said second point is reached at which time the spring will engage the shaft in an eccentric relation and will impart a rocking movement to said shaft to move said member automatically out of registering relation with said chamber, and means for limiting the rocking movement of said shaft and member to retain said member in its inoperative position to uncover said chamber.

6. In a roll film camera, the combination with a camera body formed with a spool receiving chamber, of a closure member movable to one position to close said chamber, a depending shaft carried by said member and slidably positioned in a registering opening formed in said body, a spring member carried by said body and engaging said shaft yieldably to retain said member releasably in chamber closing position, said closure member being movable axially toward and away from said chamber in axial registration therewith, a cam formed on said shaft, said cam extending axially along said shaft and radially from a point at one side of said shaft to a point beyond the axis of said shaft, as said member is moved away from said body said spring will move along said cam until said second point is reached at which time the spring will engage the shaft in eccentric relation and will impart a rocking movement to said shaft to move said member automatically out of registering relation with said chamber, and means on said shaft cooperating with said spring both to limit the rocking movement of said shaft and member and to retain said member yieldably and releasably in an inoperative position out of registry with said chamber.

7. In a roll film camera, the combination with a camera body formed with a spool receiving chamber, of a closure member movable to one position to close said chamber, a depending shaft carried by said member and slidably positioned in a registering opening formed in said body, a spring member carried by said body and engaging said shaft yieldably to retain said member releasably in chamber closing position, said closure member being movable axially toward and away from said chamber in axial registration therewith, a cam formed on said shaft, said cam extending axially along said shaft and radially from a point at one side of said shaft to a point beyond the axis of said shaft, as said member is moved away from said body said spring will move along said cam until said second point is reached at which time the spring will engage the shaft in an eccentric relation and will impart a rocking movement to said shaft to move said member automatically out of registering relation with said chamber, and a radial shoulder formed on said shaft and engageable by said spring after the latter has rocked said shaft and member to limit said rocking and to retain said member in an inoperative position and out of registry with said chamber.

References Cited in the file of this patent

UNITED STATES PATENTS

| 544,409 | Jauch | Aug. 13, 1895 |
| 1,230,623 | Teven | June 19, 1917 |
| 1,702,998 | Foltis | Feb. 19, 1929 |
| 1,911,713 | Pravda | May 30, 1933 |

FOREIGN PATENTS

| 3,000 | Great Britain | of 1897 |